United States Patent
Smith

(10) Patent No.: US 6,618,723 B1
(45) Date of Patent: Sep. 9, 2003

(54) INTERPERSONAL DEVELOPMENT COMMUNICATIONS SYSTEM AND DIRECTORY

(75) Inventor: Robert K. Smith, Dallas, TX (US)

(73) Assignee: Clear Direction, Inc., Dallas, TX (US)

( * ) Notice: Subject to any disclaimer, the term of this patent is extended or adjusted under 35 U.S.C. 154(b) by 0 days.

(21) Appl. No.: 09/721,078

(22) Filed: Nov. 22, 2000

(51) Int. Cl.[7] .............................................. G06F 17/30
(52) U.S. Cl. ........................ 707/5; 707/70; 707/104.1; 707/3
(58) Field of Search .............................. 707/100–104.1, 707/1–10; 434/322, 236–238; 705/7–9

(56) References Cited

U.S. PATENT DOCUMENTS

| | | | | |
|---|---|---|---|---|
| 5,551,880 A | * | 9/1996 | Bonnstetter et al. | 434/236 |
| 5,702,253 A | * | 12/1997 | Bryce et al. | 434/236 |
| 5,832,497 A | * | 11/1998 | Taylor | 707/104.1 |
| 5,882,203 A | | 3/1999 | Correa et al. | 434/236 |
| 5,911,581 A | | 6/1999 | Reynolds et al. | 434/236 |
| 5,954,510 A | | 9/1999 | Merrill et al. | 434/236 |
| 5,961,332 A | | 10/1999 | Joao | 434/236 |
| 5,987,415 A | * | 11/1999 | Breese et al. | 704/270 |
| 6,159,015 A | * | 12/2000 | Buffington et al. | 434/236 |
| 6,164,975 A | | 12/2000 | Weingarden et al. | 434/322 |
| 6,212,502 B1 | * | 4/2001 | Ball et al. | 704/270 |
| 6,289,340 B1 | * | 9/2001 | Puram et al. | 707/5 |
| 6,385,620 B1 | * | 5/2002 | Kurzius et al. | 707/104.1 |
| 6,401,094 B1 | * | 6/2002 | Stemp et al. | 707/10 |

OTHER PUBLICATIONS

John Austin, "The Hartman Value Profile (HVP & HVPII)" *Forms of Value and Valuation: Theory and Application*, Lanham, M.D., University Press of America, 1991, pp. 243–289.

Robert S. Hartman, "Axiology as a Science" *The Journal of Human Relations*, vol. 21, No. 1, 1973, published by Central State University, Wilberforce, Ohio, pp. 1–12.

Dr. Robert Kinsel Smith, "Formal Axiology and the Kinsel–Hartman Profile" http://www.dallas.net/~kinsel/webdoc2.htm, 4/95, pp. 1–10.

Candidate Interview Guide, www.dallas.net/~kinsel, printed Mar. 21, 2001, pp. 1–2 & pp. 1–4.

Mark A. Moore, "A Quantum Wave Model of Value Theory," in *Formal Axiology and Its Critics—Value Inquiry Book Series*, ed. Rem B. Edwards, pp. 171–215.

* cited by examiner

Primary Examiner—Greta Robinson
Assistant Examiner—Linh Black
(74) Attorney, Agent, or Firm—Womble Carlyle Sandridge & Rice, PLLC

(57) ABSTRACT

An interpersonal development communications system and directory that determines a participant's motivators and values in view of a requester's motivators and values and automatically provides recommended guidance for the requester to manage and communicate effectively with participants who are subordinates, peers and superiors in an organization. A participant logs on to an Internet-based interpersonal development communications system server, or an intranet of his firm or company, and takes the Kinsel-Hartman Profile which includes four or five lists of 18 statements each. The participant ranks all 18 statements in each list, which in turn are used to create an individual profile report. This report presents the participant's blended scores of his thinking, combining his bias and capacities concerning each dimension of value. The interpersonal development communications application ranks those thinking orientations that serve as motivators into an ordered list that determines an interpersonal development profile summary describing how to deal with and manage another member of the organization. The requestor's profile results are compared with each member and integrated with the profile summary of each member to provide unique guidance on communicating with peers, subordinates and superiors in view of the requester's motivations and values.

61 Claims, 10 Drawing Sheets

PROFILE SUMMARY: JAN BROWN

| MOTIVATIONS | REMINDERS | IN VIEW OF: | |
|---|---|---|---|
| | | MANAGER | INDIVIDUAL |
| M1 | R2 | BM | CS |
| M10 | R3 | DM | GS |
| M12 | R5 | HM | |
| M14 | R8 | IM | |
| M16 | R10 | | |
| | R11 | | |

BLENDED CAPACITIES AND BIASES

|  | \multicolumn{8}{c}{CAPACITIES} | | | | | | | |
|---|---|---|---|---|---|---|---|---|
| BIASES | 3 | 4 | 5 | 6 | 7 | 8 | 9 | 10 |
| 0 | 1 | 2 | 3 | 4 | 4 | 5 | 5 | 5 |
| 1 | 1 | 2 | 3 | 4 | 4 | 5 | 5 | 5 |
| 2 | 2 | 2 | 3 | 4 | 4 | 5 | 5 | 5 |
| 3 | 2 | 2 | 4 | 4 | 5 | 5 | 5 | 5 |
| 4 | 2 | 3 | 4 | 5 | 5 | 5 | 5 | 5 |
| 5 | 9 | 8 | 8 | 7 | 7 | 6 | 6 | 6 |
| 6 | 9 | 9 | 8 | 7 | 7 | 6 | 6 | 6 |
| 7 | 9 | 9 | 8 | 8 | 7 | 7 | 6 | 6 |
| 8 | 9 | 9 | 9 | 8 | 8 | 7 | 6 | 6 |
| 9 | 9 | 9 | 9 | 8 | 8 | 7 | 6 | 6 |
| 10 | 9 | 9 | 9 | 8 | 8 | 7 | 6 | 6 |

FIG. 1

| View | Dimension | Code | Description |
|------|-----------|------|-------------|
| World | Intrinsic | I1 | empathic thinking |
| World | Extrinsic | E1 | practical thinking |
| World | Systemic | S1 | structured thinking |
| Self | Intrinsic | I2 | self-esteem thinking |
| Self | Extrinsic | E2 | role awareness thinking |
| Self | Systemic | S2 | self direction thinking |

FIG. 2

PROFILE SUMMARY: JAN BROWN

| MOTIVATIONS | REMINDERS | IN VIEW OF: | |
| :---: | :---: | :---: | :---: |
| | | MANAGER | INDIVIDUAL |
| M1 | R2 | BM | CS |
| M10 | R3 | DM | GS |
| M12 | R5 | HM | |
| M14 | R8 | IM | |
| M16 | R10 | | |
| | R11 | | |

FIG. 3

JAN BROWN

MOTIVATIONS

Duty, Responsibility, Commitment To Self-Expectations and Standards, Accountable (M1)
Plans, Team, Justice, Reasonability, Mission, Facts, Learning (M10)
Practical Use of Time, Resources & People, Money, Effectiveness, Action, Results (M12)
Keeps In Touch Personally, Uses Intuitive Judgment ("It must feel right"), Relationships (M14)
Project Accomplisher, Loves Tangible-Practical Results (M16)

REMEMBER

Will not complain when dissatisfied (on own behalf) - check in with this person to insure things are OK
(unless issues are related to fairness or right and wrong - then you will hear about it)    (R2)

Needs time to connect to new ideas or direction, won't be able to flex or decide quickly (R3)

Is very demanding of him/herself - holds self up to excessive standards
Tell him/her how you depend on him/her (R5)

Will not be proficient at self-promotion - needs supervisor to protect or promote (R8)

Be careful not to "define" this person - definitions or labels are straightjackets (R10)

Ask this person to help you  (R11)

IN LIGHT OF YOU

You are a lot more attentive and aware of political and practical dynamics and therefore can appear to be
too political or not trustworthy because you may be too "manipulative" for this person  (BM)

You have more personal courage and therefore may be inclined to not respect this person's sensitivity or
need for approval from others  (DM)

You will need to protect this person from his/her inability or unwillingness to self-promote or contend
effectively in a political context because of your greater ability to do this for this person than s/he can do it
for her/himself (HM)

This person needs you to be patient because of his/her need to get a good feeling about something
before making a decision (IM)

Needs you to provide clear mission and expectations in order to do what you want. Will be more dogmatic
about  right and wrong that you believe is appropriate because that is how this person believes good
things get accomplished. Needs you to provide safe, predictable environment and protect it, especially
fairness, adherence to policies, and enforcement of principles and values   (CS)

This person needs direction from the company/firm more than you do and more than you'll feel is
appropriate or necessary (GS)

NOTES

FIG. 4

| DIMENSION | DIFF | LOGIC CONDITION | PRINT FILE |
|---|---|---|---|
| I1 | $|MI1 - TI1| > 2$ | MI1 > TI1<br>MI1 < TI1 | "I1MPLUS"<br>"I1TPLUS" |
| E1 | $|ME1 - TE1| > 2$ | ME1 > TE1<br>ME1 < TE1 | "E1MPLUS"<br>"E1TPLUS" |
| S1 | $|MS1 - TS1| > 2$ | MS1 > TS1<br>MS1 < TS1 | "S1MPLUS"<br>"S1TPLUS" |
| I2 | $|MI2 - TI2| > 2$ | MI2 > TI2<br>MI2 < TI2 | "I2MPLUS"<br>"I2TPLUS" |
| E2 | $|ME2 - TE2| > 2$ | ME2 > TE2<br>ME2 < TE2 | "E2MPLUS"<br>"E2TPLUS" |
| S2 | $|MS2 - TS2| > 2$ | MS2 > TS2<br>MS2 < TS2 | "S2MPLUS"<br>"S2TPLUS" |

FIG. 6A

| LOGIC CONDITION | PRINT FILE |
| --- | --- |
| MS1 - TS1 < 2 | "SAMESI" |
| MS1 > 7   AND   TS1 > 6 | "CLRJOB" |
| ME1 > 5   AND   TE2 < 6 | "NOTSLFSELL" |
| MI1 < 7   AND   TI1 > 7 | "TOOSOFT" |
| ME1 = 6,7   OR   MS1 > 8   AND   TI1 > 7 | "BEPATIENT" |
| MS1 = 6,7 AND   TS2 > 7   AND   TE2 < 5   AND   TI2 < 5 | "HELP" |
| MS1 > 7   AND   ME1 < 6   AND   ME2 < 6   AND   TE2 > 6 | "PRAISEIMPT" |
| MS1 > 6   AND   ME2 > 6   AND   TE2 < 6 | "MENTOR" |
| MI1 < 6   AND   TI1 > 7   AND   TI2 < 5 | "BE MORE SENSITIVE" |
| MAB < 1   AND   TAB > 1 | "NOT INNER AS YOU" |
| ME1 > 6   AND   (MI2 OR ME2) < 5   AND   TS1 > 7 | "BE DIRECT" |

FIG. 6B

| LOGIC CONDITION | PRINT FILE |
|---|---|
| MI1 > 6 AND MS1 > 6 AND ME1 < 6 AND TE1 > 6 AND TS1 > 6 AND TI1 < 6 | "COACH RE PEOPLE" |
| TS1 > 7 AND TE1 < 6 | "WILL JUDGE YOU AND WILL PROTECT COMPANY/JUSTICE" |
| MI1 < 6 AND TI1 > 6 | "LOYAL TO YOU AND NEEDS YOUR APPROVAL" |
| MI1 > 6 OR MI2 > 5 AND TS1 > 6 AND TI1 < 7 | "LOYALTY IS TO ORG" |

FIG. 6C

INTERPERSONAL DEVELOPMENT COMMUNICATIONS SYSTEM AND DIRECTORY

CROSS-REFERENCE TO RELATED APPLICATIONS

This application is related to, and contains common disclosure with, patent application "Personal Training and Delivery System", now U.S. Pat. No. 6,338,628, filed Feb. 15, 2000, and having the same inventorship. The related patent application is hereby incorporated by reference into this description as fully as if here represented in full.

BACKGROUND OF THE INVENTION

The present invention relates in general to modem business data processing systems, and more particularly, to a computer-implemented interpersonal development communications system and directory, and related computer business methods.

The explosive growth of the Internet over the past few years has resulted in the increasing acceptance by both businesses and consumers of conducting transactions over the Internet. Consumers are using the Internet to enhance their personal and financial lives. These consumers are pressed for time, constantly demanding convenience and 24 hour access to information and services. Commercial business enterprises are increasingly turning to the Internet to offer product and services. The present invention capitalizes on the increasing use of the Internet and corporate intranets in order to deliver personalized subordinate, peer and superior profiles and reminders to enhance an individual's ability to communicate effectively with other people, at different levels of responsibility in the same organization.

A person's decisions and actions involve a factual element which can be seen and objectively measured, and an intangible element which can be felt and known with certainty but may not be immediately or apparently expressible in reasons, facts and causes. The intangibles such as attitudes, likes, dislikes and beliefs are referred to as values. Moreover, these intangibles are usually considered to be subjective, i.e., to be the personal property of those who know the special meaning of the value words. The problem experienced is that each person's values seem to belong to him personally, to be his personal property to which others may or may not have access. Axiology, the science of value, provides a solution to this problem by forming a frame of reference which can be applied to all value situations.

The mathematical and logical structure of value concepts is the cornerstone of axiology. This structure allows the measurement of how a person thinks and perceives, rather than what he or she is thinking or perceiving. In other words, value science tells us what an individual pays attention to in his thinking, what is important to him, and what his biases and prejudices are. Axiology explains and measures the thinking processes which form the foundation for, and leads to, behavior.

Conflict occurs when the different perspectives of individuals clash, i.e., because of each individual's uniqueness, a shared or common decision cannot be reached because each individual's problems and priorities are different and because each individual's motivations emphasize different aspects of the same thing. Conflict resolution requires a problem solving technique which incorporates all perspectives into the problem solving process. Axiology is an objective format for measuring intangible attitudes and values. Moreover, axiology measures the level of development and the types of perceptual biases in an individual's thinking. Value science measures the capacity to value and provides a framework for understanding confrontational values.

The distinguishing feature about axiology is that it incorporates a third dimension into the communications and problem solving process. Every individual has certain basic physical traits, abilities and limitations which medical science can measure. The outward expression of these skills is manifested in an individual's behavior, in the way an individual uses these inborn and developed skills to relate to his environment. Human behavior can be observed, categorized and measured. The social sciences focus on the explanation of human behavior. There is a third region which stands between and incorporates the physical attributes and their outward manifestations and behavior. This region is an individual's perception of self and world and the transfer of these perceptions, concepts, and ideas. Value science mathematically defines perceptual capacity and measures the ability to create concepts out of perceptions, i.e., the ability to make value judgments. In effect, axiology measures the why of behavior by measuring the thinking process behind the behavior.

Through axiological analysis, the unique patterns which belong to each individual can be observed and studied in an objective format. An individual's patterns can be compared to those patterns which can belong to other individuals and can be integrated into actual problem situations. The objective evaluation of each person's value patterns serves as a means for helping an individual understand his or her potential for development and the blocks which can inhibit personal growth. As a result, the integrity coming from a person's unique character can be protected. At the same time, the conflicts which can and do occur because of this unique individuality can be understood, and can be prevented or diffused.

While the science of formal axiology addresses areas that are classically addressed by psychology and linguistics, its deductive nature makes it more like physics than natural philosophy. The science of axiology, which was developed by Dr. Robert S. Hartman, is a deductive science of value. It is based on Dr. Hartman's discovery and definition of the three dimensions of value, their specific and distinct properties, the isomorphic relationship of those dimensions to the concept of sets in transfinite set theory, and the modeling of human decision making with the mathematical models.

The three dimensions of value are the cornerstone of the science. Just as distance and time had to be defined and quantified in order to develop a formula for velocity, so too, the dimensions of value had to be defined and quantified to develop a formula of decision making. Dr. Hartman deduced that the properties of those three dimensions of value (the three ways that things, people, and individuals can be known) had properties that were identical to the three sets of transfinite set calculus. This is similar to a physicist modeling a driver of a car trying to keep a car on the exit ramp of a super highway. The physicist can model the trajectory of a car with the mathematics of physics without the car ever existing or without ever seeing or driving a car.

An example of a deductive process will be trying to predict defined behavior of a sub-group of American, male executives between the ages of 33 and 48, making more than $75,000.00. A person fitting into this group would have probabilities assigned to certain other observed behaviors that are consistent with a certain percentage of the members of this group. So through inductive reasoning, an assertion can be made that there is a 50% chance that the given individual found in this group drives a leased BMW or Mercedes Benz. This is a beneficial discipline, because it permits a social scientists to develop general understanding of certain groups and population. Its limitation is that every aspect of this measurement is relative to other aspects. This results in the applications being culturally and temporally limited.

Dr. Hartman categorized the dimensions of value into systemic, extrinsic, and intrinsic. Systemic value is the dimension of formal constructs; the ideas of how things should be. This dimension is one of definitions or ideas, goals, structured thinking, policies, procedures, rules, and laws. If a person values someone or an object systemically, then that person or object has to fulfill the idea perfectly. There is no middle ground for partial fulfillment in systemic value. The concept is either perfectly fulfilled or not fulfilled at all. Thus, systemic dimension is a very limited dimension. The mathematical properties of this dimension are finite sets and finite elements, i.e., there are a limited number of choices and a limited number of properties for the particular object in question. Too much attention to this dimension results in behavior that is too focused on doing things by the book, a preoccupation with planning and having things done perfectly, a tendency to measure everything and everyone against a preset idea of how they should be, and an inability to be comfortable with changes, unpredictable opportunities, and surprises. When a person ignores this dimension, the resulting behavior is an unwillingness to submit to policies and rules imposed from the outside, a skepticism about the value of spending time and money planning for the future, an inability to hold others to standards and literal agreements, an impatience with processes, and an uneasiness when systems are in place and running smoothly.

Extrinsic value is the dimension of abstracting properties and then comparing those clusters of properties to each other. This is the dimension of comparisons, relative and practical thinking. It includes the elements of the real, material world, comparisons of good/better/best, and seeing things as they compare with other things. This is the dimension of seeing things and their properties as they apply to practical situations. To value a person extrinsically is to compare that person in relation to other persons. This is what a coach of a sports team does when he compares the different players, he sees each player as a combination of skills and abilities and then decides which player will play in a particular position based on how that player's combination compares with other players. This dimension is one of results and common sense thinking, tactical planning, role satisfaction and social fulfillment. This is the primary dimension of business. Mathematically, this dimension includes infinite possibilities that can be distinguished from each other (denumerably infinite sets). However, for each comparison a limited number of characteristics apply (a finite number of elements or properties). When a person is too attentive to extrinsic value, the resulting behavior will be an overemphasis on getting things done now, a tendency to see other people as practical and political commodities, and a need for things to be changing constantly, getting visible results, and moving forward. When a person does not pay enough attention to extrinsic value, the resulting behavior will be a tendency to avoid unpredictable situations, a discounting of the energy and effort required to get something accomplished, and an avoidance of the fulfilling of social norms and values. These people do not like political dynamics, relative comparisons, or risk.

Intrinsic value is the dimension of uniqueness and singularity. Intrinsic value is the valuing of an object or person with an eye toward its singularity, uniqueness, essence, or spiritual being. When describing or valuing persons or objects in this dimension, one becomes personally involved with the object/person. There is a self-giving to the object/person which is not present in valuing extrinsically or systemically. The object/person is being valued and recognized as irreplaceable because it is seen as unique. Intrinsic valuing is the act of personally relating, empathizing, sympathizing, or intuitively feeling. It is a focus on the wholeness of the person or thing. Mathematically, this dimension includes infinite properties which are not able to be separated from each other. The mathematics of the intrinsic value is one of non-denumerably infinite sets with infinite elements (unlimited possibilities that cannot be individually identified with an unlimited number of elements concerning the person or object in question). This dimension is the richest of the three in its properties. When a person pays too much attention to intrinsic value, he will be overly attentive to the good in others, have a tendency to avoid putting others in uncomfortable positions, and sense a need to have his feelings satisfied in order for a decision to be a good decision. When a person pays too little attention to intrinsic value, the resulting behavior will be suspicion of the intentions of others, a tendency to see others functionally or as part of a system (instead of treating people as unique individuals), and a distant, protected or cold behavior when relating to others one-on-one.

As noted above, formal axiology identifies three dimensions of value. Each of the dimensions applies to both a world perspective and a self-perspective. Therefore, six major aspects of a person's thinking exist, three about the world-view and three about the self-view. The Hartman Profile measures two different aspects of a person's thinking concerning each of the six value dimensions. These are capacities to value (called dim scores by Dr. Hartman) and biases for or against that dimension (called valences by Dr. Hartman). A person's capacity to value can be likened to the resolution of the image the brain forms concerning things in that dimension of value. When the resolution is high, precise or sharp, then the person's ability to proceed and make judgments is high. When the resolution or capacity to value is low, then that person has a difficult time being precise or forming definitive judgments in that value dimension. A high capacity enables the person to be able to see pertinent input in that value dimension, process that input along with other data in that dimension, and form a judgment in light of the new data. Capacities are that which determine a person's ability to be reasonable (high capacity) or his propensity to rationalize (low capacity).

A person's bias for or against a particular value dimension is his negative or positive orientation concerning things in that particular dimension. Biases are the indication of the manner of skewing that a person does concerning each value dimension.

Both the capacity and the bias affect a person's choices, decisions, judgments and behaviors. It is the behaviors of people that are seen as motivators and demotivators which interpersonal development communications programs seek to reinforce or influence. The reason that these two scores must be consolidated into one score is that they both affect a person's behavior and choices and do so in relation to each other. By blending these two scores into one, simple and effective comparisons of the different value dimension scores can then be made and both aspects (capacities and biases) are appropriately included in the assigning of behavioral descriptions.

SUMMARY OF THE INVENTION

The present invention provides an interpersonal development communications methodology that determines an individual's interpersonal development profile summary and automatically provides the profile and reminders to an authorized requester that focus on reinforcing an individual's most important motivators. Differences in motivations and values between the authorized requestor and individual are evaluated and added to the individual's profile summary. Individual profile summaries are collected based on organization relationships to form a directory, e.g., a management directory that includes profiles: (1) for each of a manager's subordinates, (2) for the manager's peers, and (3) for the manager's supervisors.

An individual logs onto the Internet server on which the interpersonal development (IPD) communication system operates, or an intranet server of his firm or company, or a personal computer or workstation, and takes the Kinsel-Hartman Profile. The individual is required to enter a company/firm code and password to enter the IPD Internet website and then must enter his own code and password. The individual enters his e-mail address so that his individual profile report can be sent directly to him. The individual takes the Kinsel-Hartman Profile which comprises four or five lists of 18 statements each. The first two lists were developed by Dr. Robert Hartman. The other lists were developed by Dr. Robert K. Smith, the inventor of the present invention. The task is to compare the 18 statements or phrases in each list and rank them from best to worse. Through the user interface provided by the application, an individual moves the statements up and down the page until he is satisfied with the ordering.

Each of the 18 statements in each list of the profile are formal representations of value combinations. An individual ranks all 18 statements, he does not do so according to the intention of the words or phrases, but rather he ranks them based on the meaning that each of the statements has to him (the extensions). Therefore, the Kinsel-Hartman Profile provides a model of how a person arrives at meaning and gives a way to compare his extensions with the axiological intentions. It is these axiological values for each of the statements that enable the mathematical ranking of the statement according to their intentions. The resultant profile report presents the person's blended scores of his thinking, combining his biases and capacities concerning each dimension of value.

Motivations are derived from a person's positive orientations toward a particular dimension. For example, if a person has a bias of at least 50%, then that person is naturally attentive to things that are rich in those properties, therefore, that person has a natural bias or affinity towards things with those properties, i.e., the person is naturally motivated towards those things. As another example, the person with a positive orientation towards unique aspects (intrinsic value concerning world things) will be naturally motivated when someone asks for his help. This is because a person has an affinity towards other people feeling good, and an aversion to other people feeling bad. Therefore, a natural motivation is for that person to want to help other people.

Clarities get involved in the degree that the particular dimension motivates the person. The higher the clarity, the more the person is able to reason beyond his biases. Therefore, the lower the clarity, the higher the emotional tendency (toward or away from things in that dimension depending upon the bias being positive or negative). Things with positive biases that have low clarities are strong motivations and things with positive biases and high clarities are moderate or mild motivations.

The motivations and values for each individual are compiled into an interpersonal development profile summary for the individual that also takes into account differences in his motivations and values from that of his superior (or peer or subordinate). A directory is created from a compilation of these one page report summaries for each direct report, peer, and superior (collectively, "members"). Each page for a member in the directory covers three areas: (1) core motivators of that member and how best to manage and relate to a person motivated in that way; (2) reminders about that person that enable the manager be more effective; and (3) analysis of the differences in motivations and values between the manager and member and how those apply at work. Each page for peers or superiors provides insights as to how to be more effective in working with that person. Each directory also includes an appendix that gives a fuller description of the different motivations and reminders.

BRIEF DESCRIPTION OF THE DRAWINGS

The invention is better understood by reading the following detailed description of an exemplary embodiment in conjunction with the accompanying drawings, wherein:

FIG. 1 illustrates a matrix that consolidates capacities and biases in accordance with an exemplary embodiment of the present invention.

FIG. 2 illustrates the six major aspects of an individual's thinking including three world-view and three self-view aspects in accordance with an exemplary embodiment of the present invention.

FIG. 3 illustrates exemplary results generated by the interpersonal development processing logic of the present invention.

FIG. 4 illustrates an exemplary interpersonal development profile summary for a member in view of another member's profile.

FIGS. 6A–6C illustrate the processing logic in tabular form for comparing the motivations and values of one member with each other member in accordance with an exemplary embodiment of the present invention.

DETAILED DESCRIPTION OF THE INVENTION

Figure 5A:
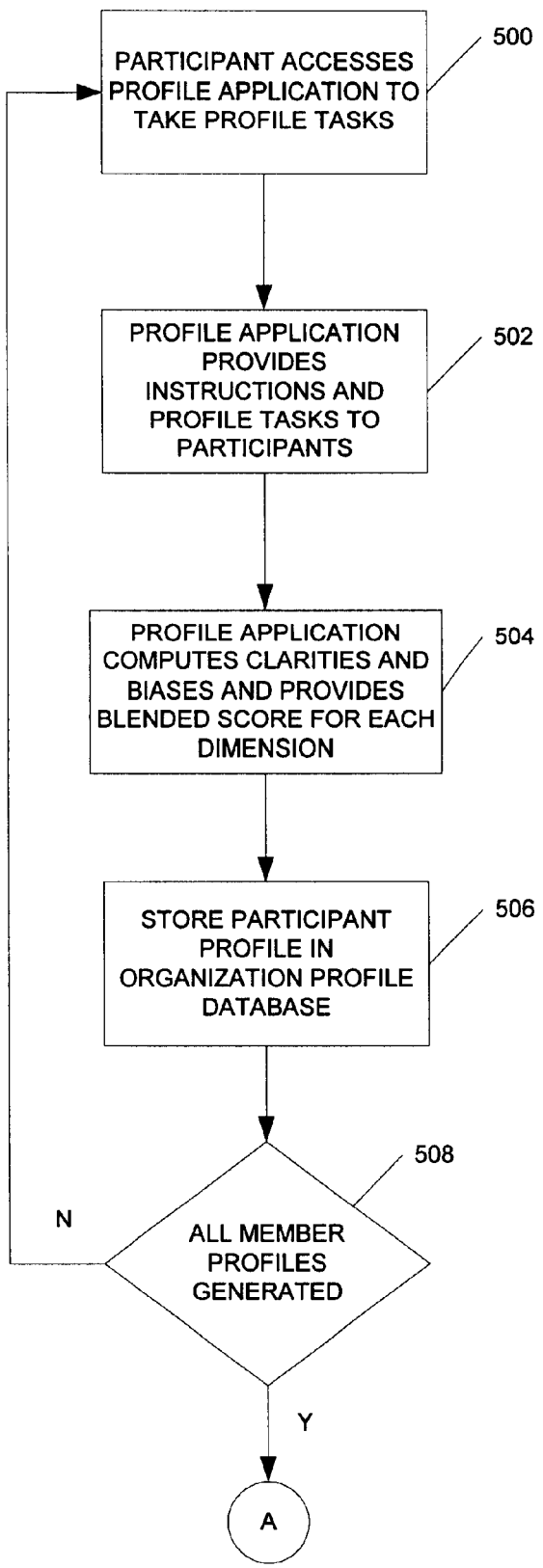
FIGS. 5A–5B illustrate the interpersonal development communications processing logic for generating a directory of interpersonal development profile summaries in an exemplary embodiment of the present invention.

The Kinsel-Hartman Profile comprises four or five tasks, each of these tasks requires that the person put 18 statements in order from best to worse. Each statement is a combination of two dimensions; a dimension to a power of another dimension. Dr. Hartman distinguished between what a thing actually is and how we understand it. The former is the intention of the object, the latter is the extension of the object.

The Kinsel-Hartman Profile differs from the Hartman Value Profile in that it adds two (in some cases three) tasks to the Hartman Profile. Statistical studies show that the randomness of a person's answers can be reduced dramatically if that person repeats a particular action the same way two times. In the case of the Hartman Value Profile, a person is asked to rank two lists of eighteen statements, one indicating that person's perspective on the world and other people, and the second one indicating that person's perspective on himself. The Kinsel-Hartman Profile provides a second world-orientation and a second self-orientation list. This provides a higher degree of reliability in the respondent's resulting report, because randomness is reduced significantly.

Each of the eighteen statements on each task represents a different value combination, with nine being values to the positive power of a valuation (called compositions) and nine being values to the negative power of a valuation (called transpositions). A composition is the appropriate application of a value upon another value. A transposition is the inappropriate application of value upon another value. With each list of eighteen statements, six intrinsic values, six extrinsic values, six systemic values, and six of each valuation are generated. These in turn are assigned mathematical values that provide an objective means by which the statements can be ranked axiologically.

The eighteen value combinations in axiological/mathematical order are:

1. intrinsic valuation of an intrinsic value;
2. intrinsic valuation of an extrinsic value;
3. intrinsic valuation of a systemic value;
4. extrinsic valuation of an intrinsic value;
5. systemic valuation of an intrinsic value;
6. extrinsic valuation of an extrinsic value;
7. extrinsic valuation of an systemic value;
8. systemic valuation of an extrinsic value;
9. systemic valuation of a systemic value;
10. systemic disvaluation of a systemic value;
11. systemic disvaluation of an extrinsic value;
12. extrinsic disvaluation of a systemic value;
13. extrinsic disvaluation of an extrinsic value;
14. systemic disvaluation of an intrinsic value;
15. extrinsic disvaluation of an intrinsic value;
16. intrinsic disvaluation of a systemic value;
17. intrinsic disvaluation of an extrinsic value; and
18. intrinsic disvaluation of an intrinsic value.

The statements on the Kinsel-Hartman profile are representative of these value combinations. By having a person rank those statements, he is providing the analyst with an ordering of value combinations. This ordering provides a model of how that person thinks about things because the ordering will demonstrate which properties that person favors (gives those compositions good rankings and those transpositions poor rankings) and which ones he does not favor. When a statement that is rich in extrinsic properties is compared to a statement that is rich in intrinsic properties by a person who favors intrinsic properties, that person will rank the statement rich in intrinsic properties as better than the extrinsically laden one because the intrinsic one is rich in properties that he favors while the other statement is void of those intrinsic properties. It is common for people who are very sympathetic towards others (intrinsic orientation) to view a concept such as "an assembly line" as a bad thing, i.e., rich in extrinsic and systemic properties, because it appears to be so void of intrinsic properties; boring, demeaning, poor quality of life of those working on the assembly line, etc.

The second aspect of a person's thinking that is modeled by the forced rankings is what Dr. Hartman called a person's "capacity to value." This is determine by summing the absolute values of the differences between the respondent's rankings and the axiological ranking for each of the three dimensions. Therefore, if a person ranks all of the intrinsic value statements close to the axiological rank, then that person is not distracted by other aspects when thinking about or considering intrinsic values. If on the other hand, that same person had rankings of systemic values that vary considerably from the axiological ranks, then that person has demonstrated that he gets distracted by other aspects when considering systemic values.

This measurement of one's capacity to reason can be likened to the resolution of a computer screen. When the screen is of poor resolution, then the person has a hard time being definitive as to whether a number on the screen is a 6 or an 8. When the resolution on the screen is very high, then the person is able to be definite and accurate as to what the exact number is. When the sum of the absolute values of the differences is high, then that person has a hard time seeing clearly in making definitive judgments concerning things in those particular value dimensions. When the sum is low, then that person is readily able to see the differences and make judgments concerning things in that value dimension. The Kinsel-Hartman Profile gets the person to evaluate each of the value combinations in relationship to each other and thus provide a model of his value structure both biases and capacities.

Biases are identified by summing the differences between the respondent's rankings for statements in the particular dimension and the ranking assigned by the principles defined by Dr. Robert Hartman. When the total sum for the particular value dimension is positive, then the bias is deemed to be positive and the choices, orientations, and decisions favor things with those value properties. When the total sum is negative, then that person's behaviors, decisions, and orientations are consistent with a negative or ignoring orientation concerning things with those properties. In both cases, the more extreme the bias, the stronger the bias, provided that both capacities are the same (a 100% positive bias is more extremely positive than a 75% positive bias).

The bias scores assigned to the bias percentages are summarized in Table 1.

TABLE 1

| BIAS SCORE | POSITIVE BIAS PERCENTAGE |
| --- | --- |
| 1 | <10% |
| 2 | 10%–19% |
| 3 | 20%–29% |
| 4 | 30%–49.999% |
| 5 | 50% |
| 6 | 51%–60% |
| 7 | 61%–70% |
| 8 | 71%–80% |
| 9 | 81%–90% |
| 10 | >90% |

Capacities are identified by summing the absolute value of the differences between the respondent's rankings and the axiological rankings. Each page of the profile has each dimension represented six times (18 statements per page). When a person's ranking of the statements representing a particular value dimension is close to the axiological rank, then that person's capacity to value things with those value properties is very great. On the other hand, great differences are an indication of the respondent's having ranked the items of that value dimension with a great variance from the axiological ranks. Behaviorally, this indicates that the respondent was distracted from, or fixated upon, particular value properties, thus indicating a fuzzy or unclear mental image when thinking about these particular properties. Dr. Hartman used the direct sum of the absolute value of the differences resulting in lower numbers indicating higher capacities; the inventor, on the other hand, uses higher numbers to represent higher capacities. The correlation between the dim score of Dr. Hartman, the capacity of Dr. Smith and a corresponding description is provided in Table 2.

TABLE 2

| Dim | Capacity | Description of Clarity |
|-----|----------|------------------------|
| 0, 1 | 10 | razor sharp |
| 2, 3 | 9 | outstanding clarity |
| 4–6 | 8 | excellent clarity |
| 7–9 | 7 | very good clarity |
| 10–13 | 6 | good clarity |
| 14–19 | 5 | fuzzy clarity |
| 20–25 | 4 | foggy clarity |
| >25 | 3 | blind, unable to form a clear concept |

When a person has a high capacity (clarity) then the effect of his bias in that particular dimension is reduced because of a high degree of reasonability, i.e., his ability to see past the bias. When the person's capacity is low, then the effective bias increases because the person is unable to easily consider alternatives other than those that fit his particular bias. The consolidation of biases and capacities are assigned according to the matrix illustrated in FIG. 1. A description of the combined capacity and bias scores is as follows:

1–3 skeptical about and unable to consider things being good in this dimension;

4–5 inattentive with some ability to consider and reason about this dimension;

6 clearly focused with a balanced orientation;

7–8 attentive to that dimension with good ability to reason;

9–10 fixated on that dimension and not readily able to reason about alternatives.

Combining the capacity and bias scores provides two benefits. The scores for the six major dimensions are blended to reflect the behavioral results stemming from the person's capacities and biases, and are blended in order to be able to quickly and easily compare the scores of the different dimensions. This provides a framework from which comparisons can be made. These scores then make it easy to identify those dimensions that the person is most likely to ignore, rationalize, fixate, or be unable to form judgments.

A person's highest clarities is a dimension in which his thinking is the clearest. In this dimension, the person has the least apprehension or is not confused thinking about things. An individual is able to think clearly about other viewpoints without getting emotionally sidetracked or distracted by irrelevant issues. This is the dimension which an individual is most willing and able to discuss objectively with others. Impatience may arise when an individual is discussing things in this dimension with a person who does not have the same clarity.

An individual's lowest clarities is the dimension in which his thinking, at the time of taking the Kinsel-Hartman Profile, is most clouded or fuzzy. This dimension is the one in which the individual has the hardest time making quick, clear, rational and objective judgments. When someone challenges an individual's decisions or actions as they relate to this dimension, the individual will be more emotional than when other dimensions are being challenged. This is the dimension for which the individual is most inclined to resort to his feelings, because he has the most difficult time processing thought in this dimension.

When a person's three self or world clarities are the same, his thinking is balanced. This means that his thinking is equally clear in each of the three dimensions. The result is a balance and sense of well being that an individual experiences internally and that others experience when they are around him. It means that a person can think with equal ease in any of the three dimensions, and therefore, discuss and interact about all three dimensions with equal objectivity. When this balance exists in an individual's world scores, it reflects a sense of well being about the world. When this balance exists in an individual's self scores, it indicates a sense of well being about one's self. A simple example of balance and well being in real life is a person who is ambidextrous, i.e., able to use either hand equally well. Ambidextrous people do not get frustrated when packages are held in their right arm and they have to unlock a car door with keys in their left hand. They do not experience frustration in contexts that non-ambidextrous people do because they are able to go with whatever presents itself with equal ease.

The following principles of clarities are utilized in the present invention.

1. people prefer to think with their highest clarities;
2. individuals do not see what others mean when they address areas regarding the individual's lowest clarities;
3. when all of an individual's clarities are high, any clarity that is low is exaggerated;
4. the lower the clarity, the stronger the bias; and
5. an individual rationalizes most often in his lowest clarities.

When an individual thinks, he naturally looks for and sees the good in things which are in those dimensions in which he has positive biases. He also looks for problems in those things which are in dimensions for which he has negative biases. Therefore, the individual is naturally optimistic and positive about some things and naturally skeptical or biased about other things.

Biases are actually imbalances in an individual's thinking. The bias score indicates that an individual has one type of thinking in comparison to other types of thinking (scores from 5–10 are positive biases). Biases are why an individual makes decisions that look balanced to him, but in fact are lopsided towards particular dimensions.

The principles of biases that are utilized in the present invention are as follows:

1. positive biased dimensions must be satisfied, or the decision, choice or action will not be seen as good to that person;
2. a negative, inattentive bias indicates that the person does not look for or see the good that comes from things in that dimension;
3. positive biases join together to reinforce a person's believing that he has an accurate perspective, which can blind the person to other considerations when making decisions; and
4. a negative bias enables a person to give more energy or attention to his positive biases.

All other things being equal, a positive bias in a systemic dimension is stronger than one in an extrinsic dimension, which is stronger than one in an intrinsic dimension.

Biases and clarities affect each other in a number of ways. The important principles to remember in understanding how biases and clarities work together are:

1. an individual needs the positive biases to be fulfilled; and
2. an individual prefers to use his clearest clarities.

When an individual's highest clarity is also a positive bias, he will be especially strong in that area because he is optimistic about it and likes to develop skills in that area. When an individual's bias is positive, but his clarity is low, he will want those things to be fulfilled (positive bias), but he will not be the one who does them. When an individual's bias is negative and his clarity is high, he will use that thinking (high clarity) to see the downside of paying attention to that dimension. Finally, when an individual's bias is negative and his clarity is low, he will avoid things in that dimension whenever possible. These are the areas in which an individual will be most emotional, most defensive, and rationalize the most.

Motivators come from either a positive bias or a high capacity. Because a positive bias indicates a positive orientation toward things with those properties, it also indicates things from which the person gets energy or with which he likes to be involved. Therefore, the person will naturally gravitate toward those things and pay attention to things pertaining to that value dimension. When people pay attention to particular dimensions, they develop expertise, experience, and maturity regarding that dimension because of the practice and attention. When a person ignores a particular dimension, then he remains immature because of the constant avoidance of those things. While the avoidance, or skepticism, concerning things in a particular dimension can be an asset or desirable orientation in certain contexts, it is not appropriate to define that skepticism as a motivator.

In order to prioritize motivational strengths in relation to each other, different weightings must be established for each of the value dimensions and for each of the capacity scores. This ordering is based on two things observed by the inventor. Those motivators that are the greatest are the ones that a person is most attentive to and familiar with and how he usually identifies himself. Therefore, the best departure point in encouraging a person and eliciting engagement in the communication process is to affirm that which he is clearly cognizant of and provide reminders to a manager that highlights those motivators.

The following descriptions and examples illustrate the different types of motivations and values that people have and statements, decisions, or factors that are naturally seen as good by those people. Keep in mind that if a particular dimension is a source of motivation for a person, then the absence of the elements of that dimension are a source of discouragement, demotivation, or frustration. For example: a person who is motivated by order and structure (M2 below) is very frustrated when a manager plays favorites, does not provide clear job descriptions, or fails to enforce company policies.

Motivations:

The list of motivators based on the individual's profile summary that is received by the individual's manager or other authorized requester contains entries adapted from the following descriptions. The motivators are listed on the individual's interpersonal development profile in an order beginning with the motivators that are strongest for the individual. "Manager Guidance" refers to specific statements included in the individual's profile to guide the manager in his relationship with the individual. "Peer Guidance" refers to specific guidance statements included in the individual's profile when the individual is a peer of the manager (authorized requester).

M1: Fulfilling one's own self-goals, expectations, standards and values.

This motivation indicates that the person sees himself to be good when he is performing according to his own expectations and standards, is known by others to be as he thinks about himself ("I am dependable therefore it is good when others see me as dependable"), and is on track to reach his own future goals.

The following statements motivate people who think this way:

1. I am asking you to do this because I have seen that you can be relied on when you commit yourself to a certain task or job.
2. Thank you for doing what you said you'd do.
3. Because you are (fill in the blank with a characteristic that the person believes is true about him/herself: smart, capable, a winner, a quick study, dependable, persistent, loyal, etc.), I am asking you to take on this project.
4. (In front of others) "(Name of person), is one of our faithful, dependable, loyal employees. We would not have the successes we've had were it not for this display of character on a consistent basis."

Peer Guidance:

Strives to be responsible, dependable, and directs him/herself from internal standards and values. Will take criticism as judgment and condemnation unless this person's trustworthiness and dependability is first acknowledged. Because s/he governs her/himself according to self-imposed values and goals, s/he will value others who do the same. When having difficulty with this person, appeal to commonly held values, principles, commitments, and responsibilities and assume that s/he is focused on trying to fulfill those, as you are.

Manager Guidance:

Is driven to be responsible, dependable, and directs him/herself from internal standards and values. Will expect his/her direct reports to be self-directing and self-accountable, as well. Will tend to value individuals who have personal goals and strive to fulfill them, have standards to which they hold themselves, and have a sense of commitment upon which others can rely. When having difficulty with this person, refer to her/his sense of responsibility and wanting to do the right thing and keep in mind that this person probably has significant pressures and responsibilities about which you are unaware. Will expect work that is associated with his/her name to be up to his/her standards.

M2: Doing what is right and expected, doing things according to schedule, agreed upon plans, within the mission or goals of the company, having things make sense, being logical, having things be predictable, fair, and dependable.

This motivation indicates that the person will be motivated to preserve order, what's right, the mission, the standards, the rules, etc. Often these people appear to be "control freaks" when in fact most of the time they don't need to have control, they just need order to be preserved and will preserve it themselves (often at personal risk or cost) if no one else is preserving the order they believe ought to be preserved. This can be as simple as correcting a person's improper grammar, to making sure everyone will be at a meeting on time, to taking on management when they see salary disparities.

The following things and statements motivate people who think this way:
1. Clear company mission, goals, and job descriptions.
2. Management's faithful and consistent enforcement of policies.
3. Holding people accountable for what they are assigned to do.
4. Fair and consistent rewards and compensation.
5. Providing information as to why decisions have been made and priorities have been set.
6. Asking the person to help you figure out the most efficient way to get something done.
7. Plans, stated purposes, goals, reasons, understanding, principles, and policies.

Peer Guidance

Team, esprit de corps, fairness, and agreed upon mission and standards are expected. When responsible for a team, s/he will protect it against outside interference. Sees colleagues as team members who can be expected to attain the mutually agreed upon goals without regularly revisiting those. Will be outspoken about things related to what is fair, right, acceptable standards, or how things should be done. May tend to avoid discussions unless issues of an absolute nature (plans, right/wrong, fairness, precedent, standards, compliance, equality, etc) so may approach things only after they have become very serious.

Manager Guidance:

Team, esprit de corps, "dutiful and trustworthy" subordinates, a common mission and standards are critical. When responsible for a team, s/he will protect it against outside interference. When given news, suggestions or ideas outside what is expected, will need time to adjust and consider new input. Surprises, interruptions or unanticipated changes are a cause of stress for this person. Sees subordinates as team members who can be expected to try to attain the mutually agreed upon goals without regularly revisiting those. Will be outspoken about things related to what is fair, right, acceptable standards, or how things should be done. May tend to avoid discussions unless issues of an absolute nature (plans, right/wrong, fairness, precedent, standards, compliance, equality, etc) so may approach things only after they have become very serious. Often managers with this orientation adapt a view that "no news is good news." Expects subordinates to fulfill their responsibilities and support one another for the sake of the whole. Often considerations put in writing are seen more favorably than things that are discussed. Will also expect his/her direct reports to be truthful, communicate information so s/he will not be surprised by not knowing something that someone outside your department knows, and will expect you to be able to be counted on in your areas of responsibility without a lot of hand-holding.

M3: Being seen as competent, capable and as a person whose efforts make a positive difference.

These people like to see a direct connection between what they do and tangible results or benefits. They are confident, like to win, and are usually willing to bring their efforts and energy to make things happen (this is sometimes neutralized by other thinking orientations). This motivation indicates that the person values his efforts, energy, and capabilities and therefore hates to have others intimate that he is not good at what he does.

The following things motivate people who think this way:
1. Recognition for their work.
2. Public praise, rewards, and being set apart for what they have accomplished.
3. Winning and/or being part of the highest status company or team.
4. Being asked to help because he is good at doing the particular task or has the needed skills.
5. Titles or office space that are indications that they are either better or valuable contributors.

Peer Guidance:

Naturally confident, likes to win, and be recognized or appreciated for his/her contribution. Public embarrassment or challenges will trigger defending his/her position, abilities, or contribution. Likes to get things done and be seen as one upon whom others can rely.

Manager Guidance:

Naturally confident, likes to be part of a "high class" team, likes to win, and likes to be recognized or appreciated for his/her contribution. Will bring energy and initiative to make things happen. Public embarrassment or challenges will trigger defending his/her position or contribution. Likes to be involved and part of bringing about results. Values confidence and initiating behavior in subordinates—will respect people who take the bull by the horns and make good things happen. Will grow frustrated with people who are scared to make a decision or take a risk. Is repulsed by whining.

M4: Effective use of time and resources.

Short meetings that lead to a practical purpose, getting things accomplished. Socially and politically useful decisions, actions, or tactics. Tangible, visible, concrete results.

The following things motivate people who think this way:
1. Money and/or tangible results.
2. People doing things together, in a group.
3. High energy and activity.
4. Games, fun, and social events that are fun and full of energy.
5. Short meetings that get things decided quickly.

Peer Guidance:

Attentive to getting results that are practical and tangible. Focuses on the practical uses of time, resources, and people. Meetings need to be productive (not long or data-laden). Will respect people who get things accomplished and will be frustrated by people who insist on studying, discussing or organizing. Is naturally attentive to social and political dynamics and will value people and actions that improve the perceptions of others and the enthusiasm of the company employees and clients/customers.

Manager Guidance:

Attentive to getting results that are practical and evident. Focuses on the practical uses of time, resources, and people. Meetings need to be to the point and productive (not long or data-laden). Studying, planning, and meetings are to move the ball forward. Employees need to get things accomplished. Is attentive to the "better" choices and therefore likes to see things move forward/advance/improve. Will be very sensitive to the intentions behind the actions. Typically, these people are not as concerned about everyone doing everything perfectly as they are concerned about everyone giving an earnest attempt to get the desired results. Make certain that your presentations are practical, useful, to the point, provide solutions, and are not boring.

M5: Being seen as valuable and special just for who he is.

This is the person's self esteem, who he is on the inside, and being a valuable person with opinions, feelings, and dignity. People who think this way need to be helpers because they see their inner intentions as good.

The following actions motivate people who think this way:
1. Calling the person by name.
2. Including this person in inner-circle types of situations.
3. Asking this person's opinion.
4. Telling others that this person is a key person in your organization.

Peer Guidance:

A naturally confident and courageous person. Likes to be included and know what is going on. Values self-development and growth and will gravitate toward others who do the same. Ask this person for his/her opinion.

Manager Guidance:

A naturally confident and courageous person. Needs to help others and be included and know what is going on. Will like to give his/her opinion and therefore will usually appreciate being asked what s/he thinks about a particular topic. Will respect people who continue to grow and people who are courageous and resilient to criticism or rejection. Be sure to keep this person informed.

M6: Paying attention to the unique value of others, caring about their feelings, opinions, and personal interests. Bringing passion and personal investment to one's work.

This motivation indicates that the person believes in the inherent goodness of individuals and therefore wants to protect that goodness (e.g., defend others' reputations) and protect individuals from having their feelings hurt.

The following statements motivate people with this orientation:

1. Will you please help me?
2. How is (family member who was sick, who was facing a difficult time, etc.)? Is there anything I can do to help?
3. Thank you for helping me, it made a big difference to me personally.
4. You are an important part as to why people like to work here.
5. I love it! (referring to a person's work).

Peer Guidance:

Naturally attentive to other's feelings and uniqueness. Invests personally in his/her work and therefore will value it as an extension of him/herself. Will respond to people asking for help. Is naturally attentive to the value of building personal relationships. Cares about the feelings and inner-concerns of individuals with whom s/he works.

Manager Guidance:

Naturally attentive to other's feelings and uniqueness. Invests personally in his/her work and therefore will value it as an extension of him/herself. Will respond to people asking for help. Is naturally attentive to the value of building personal relationships. Cares about the feelings and inner-concerns of individuals. Will be attentive to the individuality of others and will want the team to have a "family" aspect. Will not respect people who mistreat or humiliate others.

M7: People with this orientation see the world in unconventional, non-linear ways.

They see good where others see bad and bad where others see good. This leads them to arrive at solutions and ways of getting things done that do not make sense to conventional reasoners. They need creative outlets and struggle with strict adherence to formula and recipes.

The following situations motivate people with this orientation:

1. Creative problem solving.
2. Using creative, unconventional means to get results,
3. Being asked how they would approach a specific situation and not have their solution second-guessed or logically evaluated.
4. Being given different and new kinds of tasks to accomplish.

Peer Guidance:

Sees unconventional solutions to problems. Organizes in creative ways. Is able to help others with his/her insights because of how differently s/he sees things.

Management Guidance:

Arrives at solutions to problems in unconventional, creative, or novel ways. Is frustrated by "run of the mill" thinking. Is able to help others with his/her insights because of how differently s/he sees things. Will tend to get very frustrated if required to do routine things on an ongoing basis over an extended period of time.

M8: People with this thinking orientation are self managed.

They do best in contexts where individual performance is crucial for success. They are motivated when they feel that all is well in their world. They are best managed by managing the world around them and letting them set their own course of action.

Statements that work with people with this thinking orientation:

1. Your success is our goal.
2. I want you to achieve your goals beyond what anyone else thinks you can do!
3. You be successful, I'll take care of the company politics.

Peer Guidance:

Is internally directed and able to pull him/herself up from inner strengths. Will need time and non-stress environment to consider goals, values or applications of those when they differ from his/her own.

Manager Guidance:

Is internally directed and able to pull him/herself up from inner strengths. Will need time and non-stress environment to consider others' goals, values or solutions when they differ from his/her own. Will expect others to be resilient and able to stay on course, even when facing opposition or disapproval. Will have a hard time respecting people whose choices and moods are dramatically affected by others' actions, desires, or responses.

M9: Personal Commitments, Responsibility, Personal Goals, Be Viewed As Trustworthy (mild form of M1 )

Peer Guidance:

Strives to be responsible, dependable, and directs him/herself from internal standards and values. Will take criticism as judgment and condemnation unless this person's trustworthiness and dependability is first acknowledged. Because s/he governs her/himself according to self-imposed values and goals, s/he will value others who do the same. When having difficulty with this person, appeal to commonly held values, principles, commitments, and responsibilities and assume that s/he is focused on trying to fulfill those, as you are.

Manager Guidance:

Is driven to be responsible, dependable, and directs him/herself from internal standards and values. Will expect his/her direct reports to be self-directing and self-accountable, as well. Will tend to value individuals who have personal goals and strive to fulfill them, have standards to which they hold themselves, and have a sense of commitment upon which others can rely. When having difficulty with this person, refer to her/his sense of responsibility and wanting to do the right thing and keep in mind that this person probably has significant pressures and responsibilities about which you are unaware. Will expect work that is associated with his/her name to be up to his/her standards.

M10: Plans, Team, Justice, Reasonability, Mission, Facts, Learning (mild form of M2)

Peer Guidance:

Team, esprit de corps, fairness, and agreed upon mission and standards are expected. When responsible for a team, s/he will protect it against outside interference. Sees colleagues as team members who can be expected to try to attain the mutually agreed upon goals without regularly revisiting those. Will be outspoken about things related to what is fair, right, acceptable standards, or how things should be done. May tend to avoid discussions unless issues of an absolute nature (plans, right/wrong, fairness, precedent, standards, compliance, equality, etc) so may approach things only after they have become very serious.

Manager Guidance:

Team, esprit de corps, "dutiful and trustworthy" subordinates, a common mission and standards are critical. When responsible for a team, s/he will protect it against outside interference. When given news, suggestions or ideas outside what is expected, will need time to adjust and consider new input. Surprises, interruptions or unanticipated changes are a cause of stress for this person. Sees subordinates as team members who can be expected to try to attain the mutually agreed upon goals without regularly revisiting those. Will be outspoken about things related to what is fair, right, acceptable standards, or how things should be done. May tend to avoid discussions unless issues of an absolute nature (plans, right/wrong, fairness, precedent, standards, compliance, equality, etc) so may approach things only after they have become very serious. Often managers with this orientation adapt a view that "no news is good news." Expects subordinates to fulfill their responsibilities and support one another for the sake of the whole. Often considerations put in writing are seen more favorably than things that are discussed.

M11: Accomplish Things, Win, Have Fun, Be Recognized, Make Things Happen, Professional Growth (mild form of M3)

Peer Guidance:

Naturally confident, likes to win, and be recognized or appreciated for his/her contribution. Public embarrassment or challenges will trigger defending his/her position, abilities, or contribution. Likes to get things done and be seen as one upon whom others can rely.

Manager Guidance

Naturally confident, likes to win, and be recognized or appreciated for his/her contribution. Public embarrassment or challenges will trigger defending his/her position, abilities, or contribution. Likes to get things done and be seen as one upon whom others can rely.

M12: Practical Use of Time, Resources & People, Money, Effectiveness, Action, Results (mild form of M4)

Peer Guidance:

Attentive to getting results that are practical and tangible. Focuses on the practical uses of time, resources, and people. Meetings need to be productive (not long or data-laden). Will respect people who get things accomplished and will be frustrated by people who insist on studying, discussing or organizing. Is naturally attentive to social and political dynamics and will value people and actions that improve the perceptions of others and the enthusiasm of the company employees and clients/customers.

Manager Guidance:

Attentive to getting results that are practical and evident. Focuses on the practical uses of time, resources, and people. Meetings need to be to the point and productive (not long or data-laden). Studying, planning, and meetings are to move the ball forward. Personnel need to get things accomplished. Is attentive to the "better" choices and therefore likes to see things move forward/advance/improve. Will be very sensitive to the intentions behind the actions. Typically, these people are not as concerned about everyone doing everything perfectly as they are concerned about everyone giving an earnest attempt to get the desired results. Make certain that your presentations are practical, useful, to the point, provide solutions, and are not boring.

M13: Ask My Opinion, Include Me, Personal Passions, Personal Growth (mild form of M5)

Peer Guidance:

A naturally confident and courageous person. Likes to be included and know what is going on. Values self-development and growth and will gravitate toward others who do the same. Ask this person for his/her opinion.

Manager Guidance:

A naturally confident and courageous person. Needs to help others and be included and know what is going on. Will like to give his/her opinion and therefore will usually appreciate being asked what s/he thinks about a particular topic. Will respect people who continue to grow and people who are courageous and resilient to criticism or rejection. Keep this person informed.

M14: Keeps In Touch Personally, Uses Intuitive Judgment ("It must feel right"), Relationships (mild form of M6)

Peer Guidance:

Naturally attentive to the feelings and uniqueness of others. Invests personally in his/her work and therefore will value it as an extension of him/herself. Will respond to people asking for help. Is naturally attentive to the value of building personal relationships. Cares about the feelings and inner concerns of individuals with whom s/he works.

Manager Guidance:

Naturally attentive to the feelings and uniqueness of others. Invests personally in his/her work and therefore will value it as an extension of him/herself. Will respond to people asking for help. Is naturally attentive to the value of building personal relationships. Cares about the feelings and inner concerns of individuals. Will be attentive to the individuality of others and will want the team to have a "family" aspect. Will not respect people who mistreat or humiliate others.

M15: Conceptual Problem Solver, Likes to Find Solutions (variant of M9)

Manager/Peer Guidance:

Conceptual problem solver, likes to find solutions. Will protect the system that is agreed upon and proven. Will be sensitive to protecting the system, making sure that it can be relied upon. Will be frustrated when expectations are not met (computer system does not work, someone is late for a meeting, a project is not completed on time or up to standards, etc.). Often is not inclined to praise people for what they do unless their performance exceeds expectations.

M16: Project Accomplisher, Loves Tangible-Practical Results (variant of M10)

Manager/Peer Guidance:

Project accomplisher, naturally attentive to managing projects. Loves tangible-practical results. Will resist systems that protect the status quo without producing results. Will expect that her/his subordinates get the job done within the established specifications and timeframes. Will be protective of loyal, dependable, competent employees. Will have little patience or sympathy for excuses (or reasons)—is interested in results.

M17: Problem Finder, Calculates the Downsides and Risks (variant of M11)
Manager/Peer Guidance:

Problem finder, calculates the downsides and risks. Will use his/her abilities to see how to fix or correct things to make them perfect, more reliable, or more effective.

Reminders:

In view of the list of motivators and values that are the strongest for an individual, the individual's manager or other authorize requester is also provided with a list of reminders for his interpersonal relationships with the individual, with entries adapted from the following descriptions.

R1: Give Direction

This person needs his world to provide life/business direction. A clear job description, mission, and reasons for why specific behaviors are expected are needed by this person in order to move forward with confidence.

R2: No Notice

This person's desire not to make waves, not to promote his own position often results in an unwillingness to discuss problems until they are in an "all or nothing" condition. These people are often aggressive when the issues have to do with fairness, justice, or principles. They are often not aggressive concerning practical or political matters, they just decide that they no longer want to be involved with such an organization.

R3: Takes Time

This thinking orientation includes a need to get a clear understanding and a need to get a good feeling about the matter/decision/person. This need to get a good feeling takes time. Once this person does understand and personally feel good about it, then it is very difficult for this person to change or surrender this newly formed conviction or decision.

R4: Sensitive

Often these people appear to be very confident, driven or capable. Their sensitivity to their inner-self drives them to excel. It also can cause them to be excessively perfectionistic, defensive, or excessively protective of their own reputation or good standing. Therefore, when managing people with this self-orientation, be aware that behind their confidence is a sensitive person.

R5: Self-Judging

This orientation is very common among high achievers. It is an indication that this person is extremely critical of himself and is always judging his actions, choices, and accomplishments. Usually a manager of subordinates like this do better when they let this person evaluate himself because they usually do not encourage or compliment themselves. When conducting a performance review, it is often best to let this person evaluate his performance while the manager then serves as an encourager, director, and motivator. Usually, people who are self-judging do not benefit from being judged by others.

R6: Don't Shame

People with this orientation are very sensitive to how they appear in public. They are totally undone when they are embarrassed or shamed in public. If you have to correct this person or "bring him down a notch," it is best done in private so the person does not react in a defensive or aggressive manner.

R7: Self-Directed

This orientation indicates that the person does not trust the order and systems of the world and relies on his own order and systems. This means that the person is self-directed and will have his own values, goals and principles serve as his source of direction, guard rails, and standards for accountability. When these people look at the world's rules, principles, or systems, they feel that there is something inherently wrong and that the world needs this person to help bring order or structure.

R8: Too Humble

People with this orientation do not pay attention to what they actually accomplish. This causes them to miss seeing much of the good they do or seeing how much they accomplish. They tend to be ineffective in environments or situations where they have to defend or protect themselves (politically or promote their own work). They tend to not do this effectively, either too much or not enough. Therefore, you can help this person by coming alongside and protecting, defending or counseling him when situations call for him/her to protect or defend what he did or does.

R9: Ask for Advice

This person's orientation is one leads him to value giving his views, advice, and opinions. While this person may not have a position in the organization that necessitates his/her advice being sought, we have found that a great way to enlist this person's wholehearted involvement is to ask this person for his advice.

R10: Don't Define

This person has a difficult time clearly and precisely defining himself. This means that he sees himself being able to do or wanting to do many different things, being committed to fulfilling many different expectations or responsibilities, and being anxious when limited or "defined" to be one specific way or best suited for one particular role. While most business roles require clear commitment and focus, this person will have a difficult time feeling comfortable being defined in a strict or "limiting" manner.

R11: This person wants others to feel good and therefore likes to help others.

When you need this person to do something new or different, ask for him to help you.

R12: Novel Views

These people see the world differently from how most other people see things. They struggle with how the world presents itself, seeing good where others see bad and seeing bad where others see good. They therefore have a lot of creativity or novel ways of doing things. They have a difficult time doing routine jobs on a repeated basis. They help their organizations with their creative and unconventional ways of seeing how to get things done.

R13: Limited Stress Reserves

This person is so hard on himself that he has very limited reserves to handle stress at this point. Make sure this person has the support he needs to be successful.

A key aspect of the present invention is the interpersonal development communications programming logic that compares and integrates the manager's (or leader's or supervisor's) motivators, demotivators, and values with the motivators, demotivators, and values of each participating subordinate, team member, peer or superior to provide an individual interpersonal development profile summary for interaction with each participant that is based further on the differences in motivations and values for each. The individual interpersonal development profile summaries are then collected into a member directory. The programming logic generates statements from two groups: (1) statements that reflect how the manager participant is perceived by a subordinate, peer or superior based on the manager's motivators and values; and (2) statements that reflect how the motivators and values of the subordinate, peer or superior should be used effectively by the manager participant.

The first group of statements include the following:

AM: You will be more attentive to personal feelings and concerns and therefore may appear to be meddling to this person when you are trying to show concern.

BM: You are a lot more attentive and aware of political and practical dynamics and therefore can appear to be too political or not trustworthy because you may be too "manipulative" for this person.

CM: You will want closure and things to be definite more than this person does and therefore will appear to be too black and white, rigid, or excessively demanding to this person.

DM: You have more personal courage and therefore may be inclined to not respect this person's sensitivity or need for approval from others.

EM: You are more attentive to your own capabilities and practical/social standing than this person and therefore may see this person as too passive and in turn be seen by others as self-serving or overly confident.

FM: You are more self-directing and have a higher internal need to achieve than this person has for himself. This can cause you to feel this person is less ambitious and therefore less loyal to the company and in turn can cause others to think of you as too driven, insistent, or stubborn.

GM: You are inclined to give an overview of job expectations and therefore need to be careful to give more attention to providing a clear definition of success to this person. Otherwise this person is likely to become discouraged or frustrated feeling a greater need for direction than is being provided.

HM: You will need to protect this person from his/her inability or unwillingness to self-promote or contend effectively in a political context because of your greater ability to do this for this person than he can do it for himself.

IM: This person needs you to be patient because of his need to get a good feeling about something before making a decision.

JM: This person needs you to provide clarity in terms of what he should expect of himself and how s/he should specifically define success.

KM: This person needs you to praise and recognize her/his accomplishments on a regular basis—a basis which will feel like overkill to you and can feel like you are recognizing something that should be expected.

LM: Your confidence and ability to follow the company mission perfectly suit you to be able to mentor and direct this person to believe in his abilities and competencies.

The second group of statements include the following:

AS: This person needs more personal contact and interest than you'll be inclined to give or believe is appropriate. If you do not provide it, the person may feel that you are uncaring about what is important to him and therefore can adapt an attitude of not caring about what is important to you. His appeal to feelings or personal matters may very well frustrate you because they are not rational or explainable.

BS: This person will be more bottom-line, more political, and more of a risk taker than you are comfortable with—provide the reasons for what you expect, while you listen to this person's practical orientation and concerns.

CS: Needs you to provide clear mission and expectations in order to do what you want. Will be more dogmatic about right and wrong that you believe is appropriate because that is how this person believes good things get accomplished. Needs you to provide safe, predictable environment and protect it, especially fairness, adherence to policies, and enforcement of principles and values.

DS: Needs you to ask his/her opinion. If you do this you will find this person very open to being directed. If you do not do this, the person will feel his opinion is essential to your making a good decision and will be resistant to your ideas or direction.

ES: Will need more verbal and public recognition than you feel is appropriate. Will be self-serving to a degree that may be distasteful to you. Make this person a public hero and he will continue to try to do great work.

FS: Will be harder on himself (self-judging) than you are, so be careful to support and encourage this person.

GS: This person needs direction from the company/firm more than you do and more than you'll feel is appropriate or necessary.

An exemplary use of the present invention is depicted in FIGS. 3–4. As a result of taking the profile tasks, an ordered list of motivations for a fictitious person "Jan Brown" is determined by the IPD application, the codes for which are identified in the first column (headed "Motivations") of FIG. 3. Corresponding reminders are then selected by the IPD application and are identified in the second column ("Reminders"). The remaining two columns are a result of comparing the motivations and values (scores on the Kinsel-Hartman profile) of the individual in view of the manager's motivations ("In View Of Manager"), and of the manager in view of the individual's motivations and values ("In View of Individual").

Corresponding to the "motivation" codes, "reminder" codes and "in view of" codes for the fictitious person of FIG. 3, an interpersonal development profile summary is generated as illustrated in FIG. 4. The profile summary is arranged to cover three areas. The first area is the list of core motivators of the individual and guidance on how best to manage, or interact with, a person that is motivated that way. The second area is a set of reminders about the person that will enable the manager to be more effective when dealing with the individual. The third area is an analysis of the differences in motivations and values between the manager and the individual and provides guidance on how to apply the differences in the workplace environment.

Figure 5B:
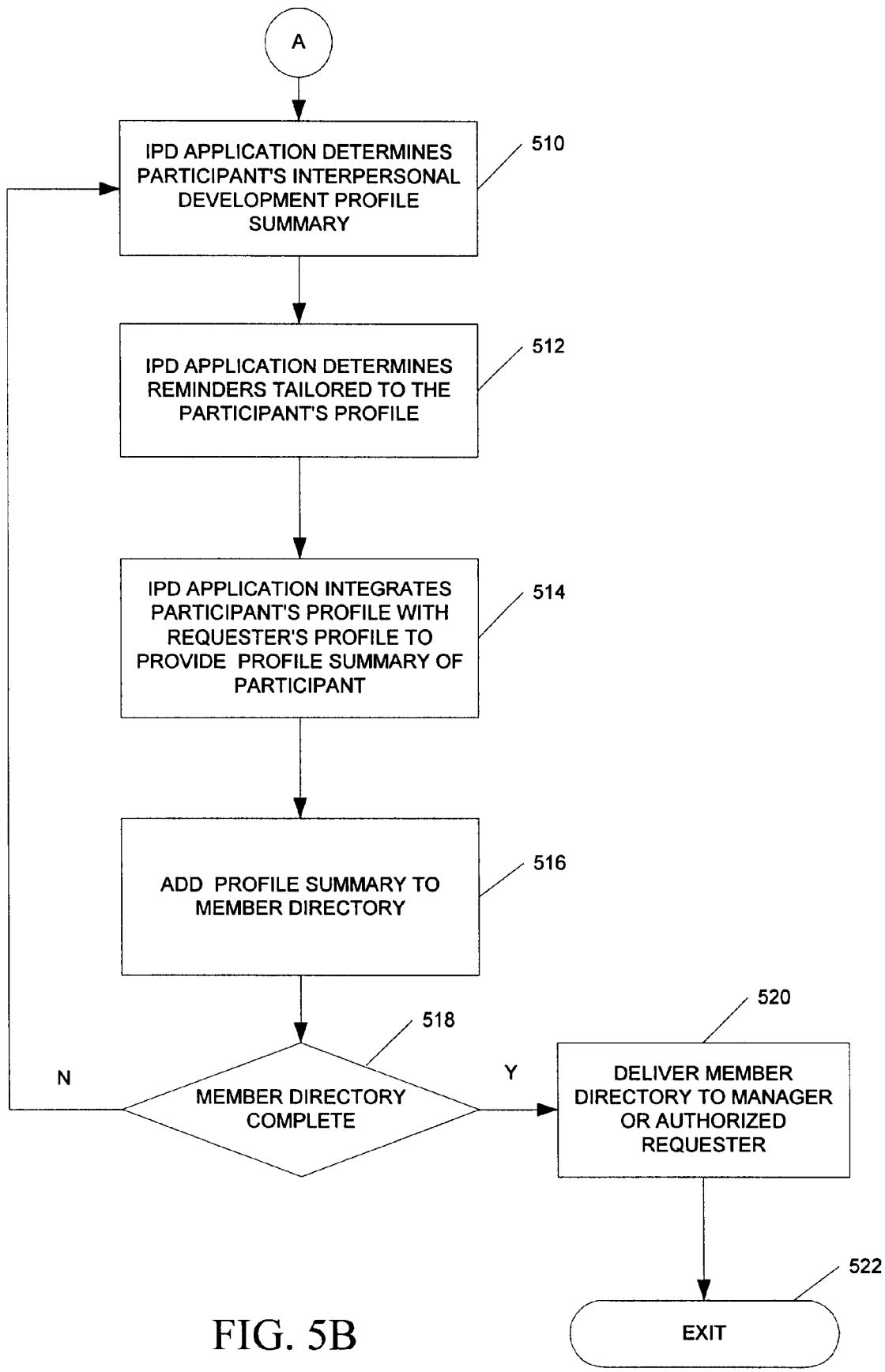

FIGS. 5A and 5B illustrate the processing logic corresponding to the interpersonal development communications system and directory. In logic block 500, the participant accesses the interpersonal development (IPD) communications system website to take the Kinsel-Hartman Profile which is a series of either four or five tasks. Upon accessing the website, a participant profile application resident at the website server provides instructions and profile tasks to the participant as indicated in logic block 502. Based on the participant's completion of the profile, the profile application then computes clarities and biases for each of the dimensions and views and provides a blended score for each dimension as indicated by logic block 504. The participant's profile is stored in the profile database at the IPD communications system web site that is maintained for the participant's organization as indicated in logic block 506. In decision block 508, a test is made to determine if all organization member profiles have been generated. If not, the processing logic returns to logic block 500 to wait for the next participant to take the profile tasks. If all organization member profiles have been generated, then processing continues with the IPD application in logic block 510. An organization member in the present context is each individual in an organization that has been requested to take the profile tasks.

As indicated in logic block 510, the IPD communications application determines the participant's interpersonal development profile summary and arranges his motivations and values sequentially in the order of importance to him. This is then followed by the IPD communications application determining corresponding reminders tailored to the participant's interpersonal development profile summary as indicated in logic block 512. In logic block 514, the interpersonal development communications application processes both the motivations and values of the participant and that of an authorized requestor (e.g., manager, peer, superior, subordinate) by comparing and integrating the participant's interpersonal development profile summary with that of the authorized requester to provide additional guidance on the profile summary of the participant based on their comparative status and differences in motivations, and values. The complete profile summary for the participant is added to the member directory as indicated in logic block 516. This is followed, in decision block 518 with a test to determine if the member directory for the requester has been completed. If it has not been completed, then the processing logic returns to logic block 510 to determine the profile summary for the next member. If the member directory is complete, then the directory is delivered electronically to the manager or authorized requestor as indicated in logic block 520. Processing then exits from the IPD application as indicated in termination block 522.

FIGS. 6A–6C indicate in a tabular form the processing logic that is used by the IPD application to analyze the differences between a manager and a subordinate and to generate text that helps the manager to apply those differences on the job. Similar processing logic is used by the IPD application to analyze the differences between a manager and a peer, and a manager and a superior. The column headed "Print File" contains the names of the text files that print when the logic condition is satisfied. FIG. 6A illustrates the logic corresponding to the existence of significant differences between the manager's and subordinate's motivations and values in both a world-view and self-view for the intrinsic, extrinsic, and systemic dimensions. In these figures, an "M" preceding a dimension code indicates the score for the manager or superior; a "T" before the dimension code indicates the score for the subordinate. For example, MI1 represents the manager's score on the empathic thinking dimension, while TI1 represents the subordinate's score for the empathic thinking dimension. Refer to FIG. 2 for a brief description corresponding to each of the six dimension codes. While the logic of FIG. 6A compares the magnitude of the differences between a manager's and a subordinate's score for a particular dimension and specific view, FIG. 6B compares actual scores of the manager and a subordinate on different dimensions. FIG. 6C is similar to FIG. 6B and contains additional refinements on the logic conditions for determining the text files that should be printed on a particular profile summary. In the context of FIGS. 6A–6C, "print file" more accurately refers to the writing to the individual's interpersonal development profile summary of the text files that correspond to his core motivations and values, reminders to the manager and the "in view of" considerations.

As an application of the above, consider a manager who has a score of 3 on E2 (role awareness thinking). This person discounts his own relative self and therefore will have strong feelings and rationalize against self-promotion. Also, consider that this same manager has a subordinate who is good at his work and has an E2 score of 8. This subordinate has to self-promote—he cannot help himself. The manager in this situation will have a hard time giving this subordinate appropriate recognition or "good jobs!" because he is so adverse to the subordinate's self-promoting style, and his requests for personal recognition. The manager's bias will cause him to ignore or not see how good the employee is actually doing because of his aversion concerning the actions of the subordinate. The reminder tells the manager this and also tells him that when (in his view) he is giving too much recognition, he is probably giving just barely enough (in the subordinate's view).

Figure 7:
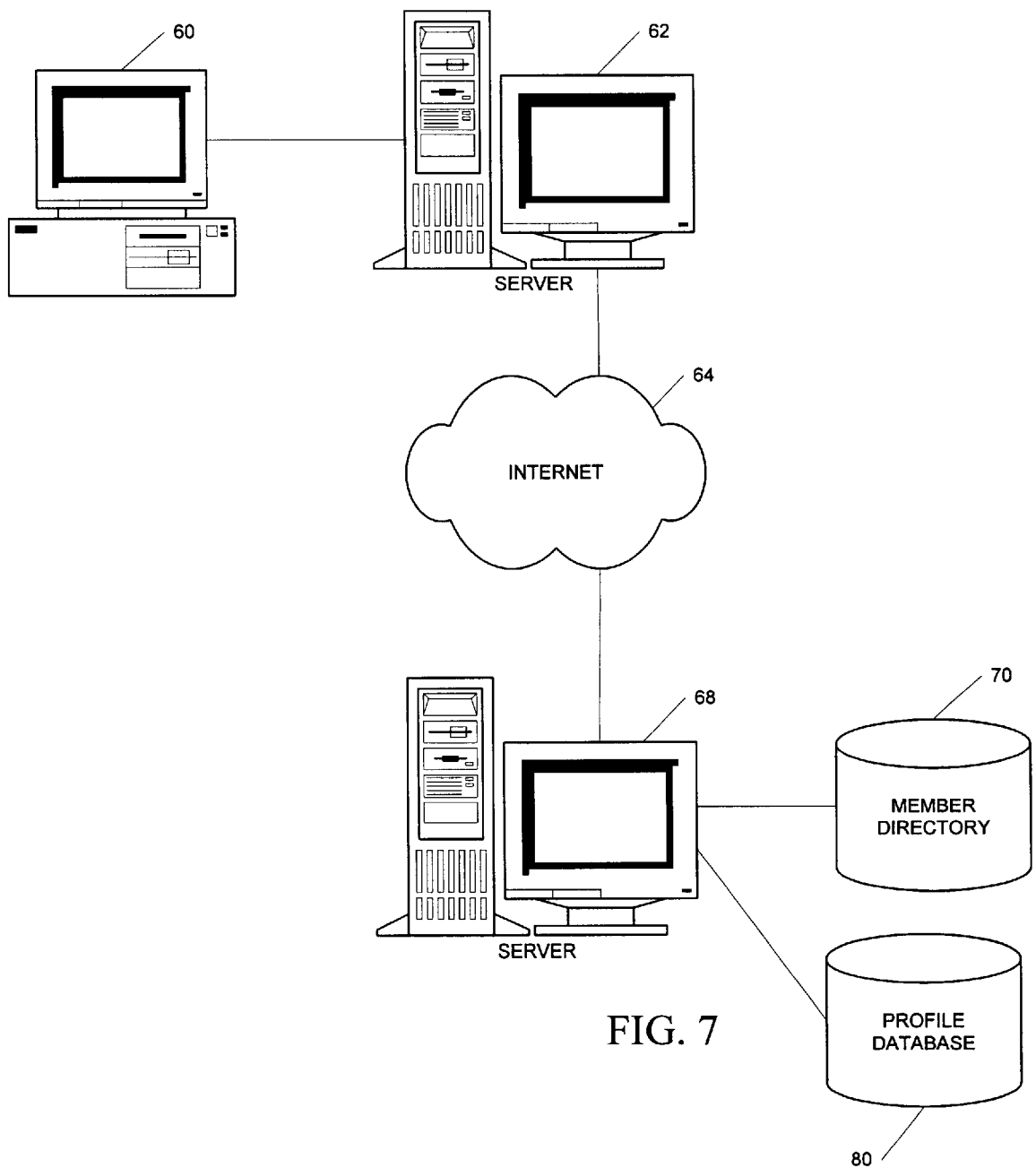
FIG. 7 depicts an environment in which an exemplary embodiment of the present invention operates.

FIG. 7 illustrates an environment in which the present invention operates. A participant at desktop, laptop, or workstation 60 connects to his Internet service provider 62 to obtain an Internet connection over Internet 64 to the IPD server 68. IPD server 68 stores the participant profile application that provides the Kinsel-Hartman Profile task to the participant and determines the participant's clarities and biases, which is stored in the profile database 80, maintained for the participant's organization. The interpersonal development communications program also resident at the IPD server 68 provides a summary report back to the requester for each member including the participant's key motivators and values and reminders on how to effectively communicate with each participant. At the IPD server 68, there is also an interpersonal development communications profile summary (i.e., member directory) database 70 which stores the results of comparing and integrating the participant profiles of individuals in a superior-subordinate or peer-to-peer relationship that accounts for the motivators and values of each individual in the member directory in a two-party relationship.

The interpersonal development communications system has been described in the context of an employment scenario to enable a manager or authorized requester to deal more effectively with other members of the organization or team. Disaffection with superiors in the workplace is the leading cause of personnel turnover, a problem that corporations and businesses have been unable to effectively address. The methods of the present invention provide a novel approach to assisting superiors to more effectively deal with and manage subordinates. It also provides a novel approach to developing peer-to-peer and subordinate-to-superior relationships. But the extensions to other uses should be readily apparent to one of skill in the art. For example, the IPD application can be adapted to determine and form a team or alliance in which the team members share a common set of core motivators. This aspect of comparing and analyzing interpersonal motivations can also be adapted to non-work relationships, including counseling family members such as husband-wife (peer relationship) or parent-child (superior-subordinate relationship). The methods can also be adapted to match potential partners in a personal/emotional relationship.

The interpersonal development communications system of the present invention has been described as an application program resident on a server 68 with an associated interpersonal development database 70, and accessible over a public non-trusted network such as the Internet or over an organization's intranet. It is important to note; however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD-ROMs, and transmission type media such as analog or digital communications links.

Additionally, the corresponding structures, materials, acts, and equivalents of all means plus function elements in any claims are intended to include any structure, material or acts for performing the function in combination with other claimed elements as specifically claimed.

While the invention has been particularly shown and described with reference to a preferred embodiment thereof, it will be understood by those skilled in the art that various other changes in form and detail may be made without departing from the spirit and the scope of the invention.

What is claimed is:

1. An interpersonal development communications system for providing a directory of interpersonal development profile summaries for participating subordinates, peers, and superiors to an authorized requester over a communications network, comprising:

an interpersonal development directory database including a plurality of text files which are selected and presented to the requester based on clarities and biases for a set of value dimensions for each participating subordinate, peer and superior;

a server including a processor for operating a participant profile logic module that blends a clarity score and a bias score for each dimension into a single set of scores that are a measure of the participant's values, motivators, and demotivators; and an interpersonal development communications logic module that compares and integrates the requester's set of scores with the set of scores for each participating subordinate, peer and superior to provide the requester with an interpersonal development profile summary for each participant to improve the requester's personal interaction with each participant.

2. The interpersonal development communications system of claim 1 wherein the interpersonal development profile summaries include a motivations section, a reminders section and a requester/participant guidance section.

3. The interpersonal development communications system of claim 2 wherein the motivations section includes text file entries that are determined by evaluation of the scores for the participant that are generated by the profile logic module.

4. The interpersonal development communications system of claim 2 wherein the reminders section includes text file entries that are generated as reminders to the requester based on the participant's motivations and values.

5. The interpersonal development communications system of claim 2 wherein the requester/participant guidance section includes text files entries that are determined based on a comparison and analysis of the requester's and participant's set of scores.

6. The interpersonal development communications system of claim 5 wherein the guidance text file entries include guidance for the requester in interacting with the participant in view of the requester's motivations.

7. The interpersonal development communications system of claim 5 wherein the guidance section text file entries include guidance for the requester in interacting with the participant in view of the participant's motivations.

8. The interpersonal development communications system of claim 1 wherein the communications network is the Internet.

9. The interpersonal development communications system of claim 1 further comprising a computing system for use by the participant in accessing the server over the communications network.

10. The interpersonal development communications system of claim 9 wherein the computing system includes any one of a desktop computer, a workstation, a notebook computer, a handheld personal digital assistant, a cellular phone, and an interactive pager.

11. The interpersonal development communications system of claim 9 wherein the computing system accesses the server by a wired connection.

12. The interpersonal development communications system of claim 9 wherein the computing system accesses the server by a wireless connection.

13. A method for providing a directory including a plurality of interpersonal development profile summaries to a requester in an interpersonal development communications system for participating subordinates, peers and superiors, comprising the acts of:

accessing a profile logic module from a personal computing system by each participant to take a profile having a plurality of tasks to be performed interactively;

determining each participant's profile scores on a plurality of dimensions of value as a result of each participant's responses on the plurality of tasks;

determining each participant's primary motivations and values based on the participant's profile scores; and comparing and integrating the motivations and values of each participant with the motivations and values of the requester to provide an interpersonal development profile summary for each participant that guides interaction by the requester with the participant.

14. The method for providing a directory including a plurality of interpersonal development profile summaries of claim 13 wherein each of the plurality of tasks includes a set of statements that are ordered by the participant.

15. The method for providing a directory including a plurality of interpersonal development profile summaries of claim 13 wherein each of the plurality of tasks measures the participant's clarities and biases on each of the plurality of dimensions of value.

16. The method for providing a plurality of interpersonal development profile summaries of claim 7 wherein the plurality of dimensions of value include a systemic value, an extrinsic value and an intrinsic value.

17. The method for providing a directory including a plurality of interpersonal development profile summaries of claim 16 wherein each of the dimensions of value includes a self view and a world view.

18. The method for providing a directory including a plurality of interpersonal development profile summaries of claim 15 wherein a list of the participant's core motivations is generated by determination of each participant's clarities and biases for each dimension of value.

19. The method for providing a directory including a plurality of interpersonal development profile summaries of claim 13 further comprising the act of blending each participant's clarities and biases into a composite score for each dimension of value.

20. The method for providing a directory including a plurality of interpersonal development profile summaries of claim 13 further comprising writing a plurality of text files to the interpersonal development profile summary for each participant.

21. The method for providing a directory including a plurality of interpersonal development profile summaries of claim 20 wherein the text files written to the interpersonal development profile summary for each participant includes a motivations section, a reminders section and a requester/participant guidance section.

22. The method for providing a directory including a plurality of interpersonal development profile summaries of claim 21 wherein the motivations section includes text file entries that are determined by evaluation of the scores for the participant that are generated by the profile logic module.

23. The method for providing a directory including a plurality of interpersonal development profile summaries of claim 21 wherein the reminders section includes text file entries that are generated as reminders to the requester based on the participant's motivations and values.

24. The method for providing a directory including a plurality of interpersonal development profile summaries of claim 21 wherein the requester/participant guidance section includes text files entries that are determined based on a comparison and analysis of the requester's and participant's set of scores.

25. The method for providing a directory including a plurality of interpersonal development profile summaries of claim 24 wherein the guidance text file entries include guidance for the requester in interacting with the participant in view of the requester's motivations and values.

26. The method for providing a directory including a plurality of interpersonal development profile summaries of claim 24 wherein the guidance section text file entries include guidance for the requester in interacting with the participant in view of the participant's motivations and values.

27. The method for providing a directory including a plurality of interpersonal development profile summaries of claim 13 further comprising determining a corresponding plurality of reminders for each participant based on the participant's motivations and values.

28. A computer readable medium containing a computer program product for providing a directory including interpersonal development profile summaries to a requester for each participant in an interpersonal development communications program that measures each participant's motivations, the program product comprising:

program instructions that enable each participant to access a profile logic module from a personal computing system to take a profile having a plurality of tasks to be performed interactively;

program instructions that determine each participant's profile scores on a plurality of dimensions of value as a result of each participant's responses on the plurality of tasks;

program instructions that determine each participant's primary motivations and values based on the profile scores and orders each participant's primary motivations; and program instructions that compare and integrate the motivations and values of each participant with the motivations and values of the requester to provide an interpersonal development profile summary that guides interaction by the requester with each participant.

29. The computer program product for providing a directory including interpersonal development profile summaries of claim 28 wherein each of the plurality of tasks includes a set of statements that are ordered by the participant.

30. The computer program product for providing a directory including interpersonal development profile summaries of claim 28 wherein each of the plurality of tasks measures each participant's clarities and biases on each dimension of value.

31. The computer program product for providing a directory including interpersonal development profile summaries of claim 28 wherein the dimensions of value include a systemic value, an extrinsic value and an intrinsic value.

32. The computer program product for providing a directory including interpersonal development profile summaries of claim 31 wherein each dimension of value includes a self view and a world view.

33. The computer program product for providing a directory including interpersonal development profile summaries of claim 28 further comprising program instructions that automatically generate a profile report by determination of each participant's clarities and biases for each of the plurality of dimensions of value.

34. The computer program product for providing a directory including interpersonal development profile summaries of claim 28 further comprising program instructions that blend each participant's clarities and biases into a composite score for each dimension of value.

35. The computer program product for providing a directory including interpersonal development profile summaries of claim 28 further comprising program instructions that write a plurality of text files to the interpersonal development profile summary for each participant.

36. The computer program product for providing a directory including interpersonal development profile summaries of claim 35 wherein the text files written to the interpersonal development profile summary for each participant includes a motivations section, a reminders section and a requester/participant guidance section.

37. The computer program product for providing a directory including interpersonal development profile summaries of claim 36 wherein the motivations section includes text file entries that are determined by program instructions that evaluate the scores for the participant generated by the profile logic module.

38. The computer program product for providing a directory including interpersonal development profile summaries of claim 36 wherein the reminders section includes text file entries that are generated by program instructions as reminders to the requester based on the participant's motivations and values.

39. The computer program product for providing a directory including interpersonal development profile summaries of claim 36 wherein the requester/participant guidance section includes text file entries that are determined by program instructions that compare and analyze the requester's and participant's set of scores.

40. The computer program product for providing a directory including interpersonal development profile summaries of claim 39 wherein the guidance text file entries include guidance for the requester in interacting with the participant in view of the requester's motivations.

41. The computer program product for providing a directory including interpersonal development profile summaries of claim 39 wherein the guidance section text file entries include guidance for the requester in interacting with the participant in view of the participant's motivations and values.

42. The computer program product for providing a directory including interpersonal development profile summaries of claim 28 further comprising program instructions that determine a corresponding plurality of reminders for each participant based on the interpersonal development profile summaries.

43. An interpersonal development communications system for providing counseling services to pairs of participants in a partner relationship, comprising:

an interpersonal development database including a plurality of text files which are selected and presented to an authorized requester based on clarities and biases for a set of value dimensions for each participant;

a processor for operating a participant profile logic module that blends a clarity score and a bias score for each dimension into a single set of scores that measure each participant's motivations and values; and an interpersonal development logic communication logic module that compares and integrates the scores of each partner in a paired relationship to provide the counselor with an interpersonal development profile summary for each partner to provide guidance on effectively communicating between partners.

44. The interpersonal development communications system of claim 43 wherein each participant in the partner relationship is a peer.

45. The interpersonal development communications system of claim 43 wherein one of the participants in the partner relationship is subordinate to the other participant.

46. The interpersonal development communications system of claim 43 wherein the interpersonal development profile summaries include at least a motivations section and a partner guidance section.

47. The interpersonal development communications system of claim 46 wherein the motivations section includes text file entries that are determined by evaluation of the participant's scores generated by the profile logic module.

48. The interpersonal development communications system of claim 46 wherein the partner guidance section includes text file entries that are determined based on a comparison and analysis of each paired partner's set of scores.

49. The interpersonal development communications system of claim 48 wherein the partner guidance section provides guidance for one partner in communicating with the other partner in view of the one partner's motivations and values and in view of the other partner's motivations and values.

50. A method for providing counseling services to pairs of participants in a partner relationship using an interpersonal development communication system, comprising the acts of:

accessing a profile logic module by each participant to take a profile having a plurality of tasks to be performed;

determining each participant's profile scores on a plurality of value dimensions as a result of each participant's responses on the plurality of tasks;

determining each participant's primary motivations and values based on the participant's profile scores; and comparing and integrating the motivations and values of each participant in a partner relationship to provide a counselor with an interpersonal development profile summary for each partner to provide guidance on effectively communicating between partners.

51. The method for providing counseling services to pairs of participants in a partner relationship of claim 50 further comprising writing a plurality of text files to the interpersonal development profile summary for each partner.

52. The method for providing counseling services to pairs of participants in a partner relationship of claim 51 wherein the text files written to the interpersonal development profile summary for each partner includes at least a motivations section and a partner guidance section.

53. The method for providing counseling services to pairs of participants in a partner relationship of claim 52 wherein the motivations section includes text file entries that are determined by evaluation of the participant's scores generated by the profile logic module.

54. The method for providing counseling services to pairs of participants in a partner relationship of claim 52 wherein the partner guidance section includes text file entries that are determined based on a comparison and analysis of each paired partner's set of scores.

55. The method for providing counseling services to pairs of participants in a partner relationship of claim 54 wherein the partner guidance section provides guidance for one partner in communicating with the other partner in view of the one partner's motivations and values and in view of the other partner's motivations and values.

56. A computer readable medium containing a computer program product for providing counseling services to pairs of participants in a partner relationship in an interpersonal development communication system, the program product comprising:

program instructions that enable access to a profile logic module by each participant to take a profile having a plurality of tasks to be performed;

program instructions that determine each participant's profile scores on a plurality of value dimensions as a result of each participant's responses on the plurality of tasks;

program instructions determine each participant's primary motivations and values based on the participant's profile scores; and program instructions that compare and integrate the motivations and values of each participant in a partner relationship to provide a counselor with an interpersonal development profile summary for each partner to provide guidance on effectively communicating between partners.

57. The computer program product for providing counseling services to pairs of participants in a partner relationship of claim 56 further comprising program instructions that write a plurality of text files to the interpersonal development profile summary for each partner.

58. The computer program product for providing counseling services to pairs of participants in a partner relationship of claim 56 wherein the text files written to the interpersonal development profile summary for each partner includes at least a motivations section and a partner guidance section.

59. The computer program product for providing counseling services to pairs of participants in a partner relationship of claim 58 wherein the motivations section includes text file entries that are determined by program instructions that evaluate the participant's scores generated by the profile logic module.

60. The computer program product for providing counseling services to pairs of participants in a partner relationship of claim 58 wherein the partner guidance section includes text file entries that are determined by program instructions that compare and analyze each paired partner's set of scores.

61. The computer program product for providing counseling services to pairs of participants in a partner relationship of claim 60 wherein the partner guidance section provides guidance for one partner in communicating with the other partner in view of the one partner's motivations and values and in view of the other partner's motivations and values.

\* \* \* \* \*